(12) United States Patent
Gardes et al.

(10) Patent No.: US 11,193,379 B2
(45) Date of Patent: Dec. 7, 2021

(54) TURBOFAN COMPRISING A SET OF ROTATABLE BLADES FOR BLOCKING OFF THE BYPASS FLOW DUCT

(71) Applicant: Airbus Operations SAS, Toulouse (FR)

(72) Inventors: Pascal Gardes, Levignac (FR); Antoine Cousin, L'Union (FR); Antoine Boudou, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 87 days.

(21) Appl. No.: 16/826,963

(22) Filed: Mar. 23, 2020

(65) Prior Publication Data

US 2020/0362708 A1    Nov. 19, 2020

(30) Foreign Application Priority Data

Mar. 25, 2019    (FR) ...................................... 1903068

(51) Int. Cl.
*F01D 7/00* (2006.01)
*F01D 25/24* (2006.01)

(52) U.S. Cl.
CPC ............... *F01D 7/00* (2013.01); *F01D 25/24* (2013.01); *F05D 2220/323* (2013.01); *F05D 2220/36* (2013.01); *F05D 2240/60* (2013.01); *F05D 2260/30* (2013.01)

(58) Field of Classification Search
CPC ..... F02K 1/09; F02K 1/64; F02K 1/70; F02K 1/72; F02K 1/763; F01D 7/00; F01D 25/24
See application file for complete search history.

(56) References Cited

U.S. PATENT DOCUMENTS

| 2,933,890 A | 4/1960 | Morrison |
| 4,137,711 A * | 2/1979 | Montgomery ............ F02K 1/72 60/226.2 |
| 9,074,554 B2 * | 7/2015 | Caruel .................... F02K 1/763 |
| 10,830,089 B2 * | 11/2020 | Gardes .................. F01D 17/167 |
| 2017/0198658 A1 | 7/2017 | Higgins |

(Continued)

FOREIGN PATENT DOCUMENTS

| DE | 1937679 A1 | 2/1971 |
| FR | 3067760 A1 | 12/2018 |

OTHER PUBLICATIONS

French Search Report; priority document.

*Primary Examiner* — Craig Kim
(74) *Attorney, Agent, or Firm* — Greer, Burns & Crain, Ltd.

(57) ABSTRACT

A turbofan having a nacelle including a slider mobile in translation between advanced and retracted positions to open a window between a duct and the exterior, a plurality of blades, each being mobile in rotation on the slider between stowed and deployed positions, and a maneuvering system that moves each blade and includes, for each blade, a shaft mobile in rotation on the slider and on which the blade is fixed, an arm having a first end fixed to the shaft and a second end, an arc which is coaxial with the longitudinal axis and is rotatably mounted on the slider, about the longitudinal axis, a lever mounted in articulated fashion between the arc and the second end of the arm, and an actuation system which rotates the arc in one direction and in the other.

3 Claims, 3 Drawing Sheets

(56) References Cited

U.S. PATENT DOCUMENTS

2018/0372025 A1   12/2018  Ridray et al.
2020/0325848 A1*  10/2020  Gardes ..................... F02K 1/09
2021/0017935 A1*   1/2021  Cazeaux .................. F02K 1/72

* cited by examiner

TURBOFAN COMPRISING A SET OF ROTATABLE BLADES FOR BLOCKING OFF THE BYPASS FLOW DUCT

CROSS-REFERENCES TO RELATED APPLICATIONS

This application claims the benefit of the French patent application No. 1903068 filed on Mar. 25, 2019, the entire disclosures of which are incorporated herein by way of reference.

FIELD OF THE INVENTION

The present invention relates to a turbofan which comprises a set of blades which are mounted so as to be able to rotate in order to block the duct for the bypass flow, and to an aircraft comprising at least one such turbofan.

BACKGROUND OF THE INVENTION

An aircraft includes a fuselage to each side of which is fixed a wing. Under each wing is suspended at least one turbofan. Each turbofan is fixed under the wing by means of a pylon that is fixed between the structure of the wing and the structure of the turbofan.

The turbofan comprises a motor and a nacelle that is fixed around the motor. The turbofan has, between the nacelle and the motor, a bypass duct in which a bypass flow flows.

The nacelle comprises a plurality of reversal doors, each one being mobile in rotation on the structure of the nacelle, between a stowed position in which it is not in the bypass duct and a deployed position in which it is positioned across the bypass duct in order to redirect the bypass flow towards a window which is in the wall of the nacelle and which is open between the bypass duct and the outside of the nacelle.

Thus, the bypass flow is redirected to the outside and more specifically towards the front of the engine in order to generate reverse thrust. Moreover, each reversal door is moved using a connecting rod which crosses the bypass duct in the stowed position and which thus partially blocks the bypass duct.

Although the reversal doors are entirely satisfactory, it is desirable to find different mechanisms, in particular mechanisms which are more lightweight and which in no way obstruct the bypass flow when in the stowed position.

SUMMARY OF THE INVENTION

One object of the present invention is to propose a turbofan which comprises a set of blades which are mounted so as to be able to rotate in order to block the duct of the bypass flow.

To that end, a turbofan is proposed having a longitudinal axis and comprising a motor and a nacelle, surrounding the motor, which comprises a fan casing, in which a duct for a bypass flow is delimited between the nacelle and the motor, and in which a flow of air flows in a flow direction, said nacelle comprising:

a fixed structure fixed to the fan casing,
a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between them, an open window between the duct and the exterior of the nacelle,
a plurality of blades, each one comprising a first end mounted so as to be mobile in rotation on the slider about an axis of rotation, and where the blades are angularly offset from one to the next about the longitudinal axis, wherein each blade is mobile between a stowed position in which the blade is outside the duct and a deployed position in which the blade is across the duct,
an assembly of actuators causing the slider to move between the advanced position and the retracted position, and vice versa, and
a maneuvering system intended to move each blade from the stowed position to the deployed position and vice versa, where the maneuvering system comprises:
for each blade, a shaft mounted so as to be mobile in rotation on the slider about an axis of rotation, and on which the blade is fixed,
for each shaft, an arm which has a first end fixed to the shaft and a second end,
an arc which is coaxial with the longitudinal axis and is mounted so as to be mobile in rotation, on the slider, about the longitudinal axis,
for each arm, a lever mounted in articulated fashion between the arc and the second end of the arm, and
an actuation system which rotates the arc in one direction and in the other.

An engine of this kind permits a reduction in mass by replacing the reversal doors and their drive mechanisms with more lightweight pivoting blades having a simplified maneuvering system.

Advantageously, the first end of each arm takes the form of a pair of pincers that grip the shaft and comprise a tightening screw that tightens the two pincers towards one another.

The invention also proposes an aircraft comprising at least one turbofan in accordance with one of the above variants.

BRIEF DESCRIPTION OF THE DRAWINGS

The above-mentioned features of the invention, along with others, will become more clearly apparent on reading the following description of one exemplary embodiment, said description being given with reference to the appended drawings, in which.

DETAILED DESCRIPTION OF THE PREFERRED EMBODIMENTS

In the following description, the terms relating to a position refer to the direction of flow of the air in an engine which therefore flows from the front to the rear of the aircraft.

Figure 1:
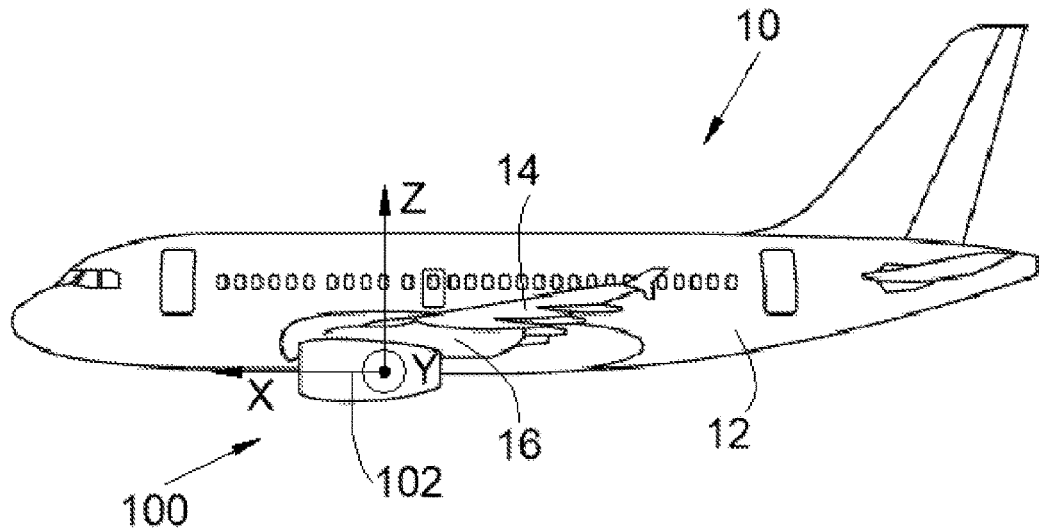
FIG. 1 is a side view of an aircraft comprising a turbofan according to the invention.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
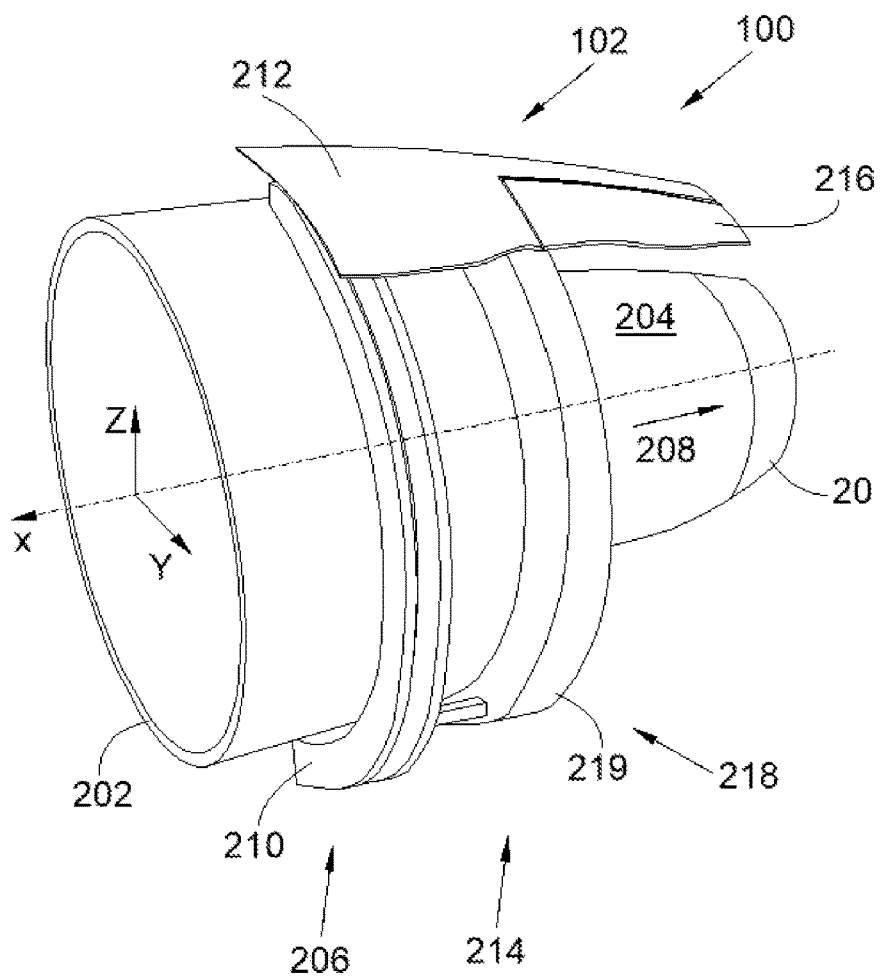
FIG. 2 is a perspective view of the turbofan according to the invention in the advanced and stowed position.
Figure 3:
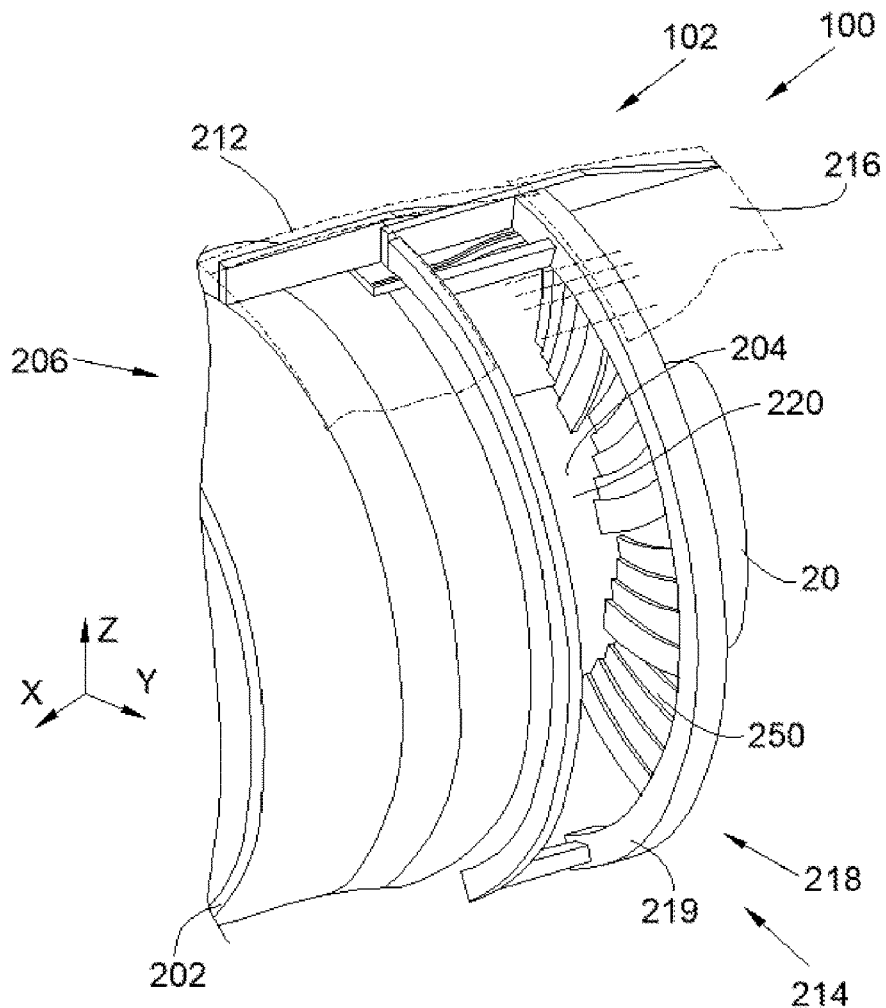
FIG. 3 is a perspective view of the turbofan according to the invention in the retracted and deployed position.

FIG. 2 and FIG. 3 show the turbofan 100 which has a nacelle 102 and a motor 20 which is housed inside the nacelle 102 and comprises a fan casing 202. The motor 20 is represented by its rear exhaust part.

In the following description, and by convention, X denotes the longitudinal axis of the turbofan 100 that is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being mutually orthogonal.

Figure 4:
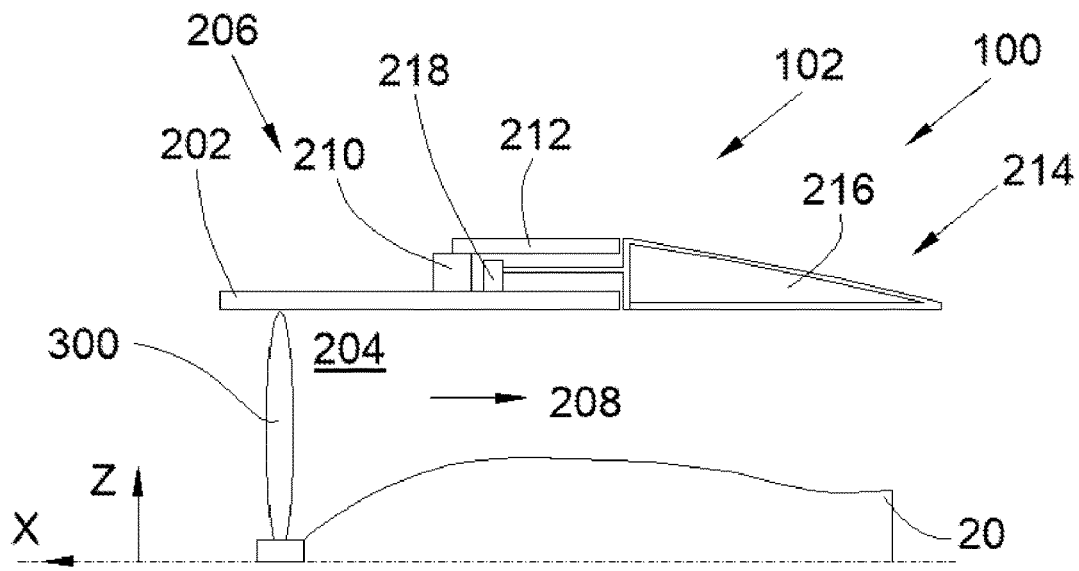
FIG. 4 is a schematic representation of a turbofan according to the invention, viewed in vertical section.

FIG. 2 and FIG. 3 show the turbofan 100 in two different use positions, and FIG. 4 shows a schematic representation in section of the turbofan 100.

The turbofan 100 has, between the nacelle 102 and the motor 20, a duct 204 in which flows a bypass flow 208 coming from the air intake through a fan 300, and which therefore flows in the flow direction from forward to rear.

The nacelle 102 has a fixed structure 206 that is mounted fixed on the fan casing 202. Here in particular, the fixed structure 206 comprises a front frame 210 mounted around the fan casing 202 and outer panels 212 forming an aerodynamic surface which are shown as transparent in FIG. 3, and of which a portion is cut away in FIGS. 2 and 3.

The nacelle 102 has a mobile assembly 214 which has a mobile cowl 216 (also transparent in FIG. 3) of which a portion is cut away in FIGS. 2 and 3 and which forms the outer walls of the nozzle.

The nacelle 102 also has a slider 218. In this case, the slider 218 is in the form of a cylinder having openwork walls. The mobile cowl 216 is fixed to and downstream of the slider 218 with respect to the direction of flow of the flow of air in the turbofan 100.

The slider 218 is mounted mobile in translation in a translation direction globally parallel to the longitudinal axis X on the fixed structure 206 of the nacelle 102.

The slider 218 is mobile between an advanced position (FIG. 2) and a retracted position (FIG. 3) and vice versa. In the advanced position, the slider 218 is positioned as far forward as possible, with respect to the flow direction, such that the mobile cowl 216 is moved close to the outer panels 212 and to the fan casing 202 and thus forms an aerodynamic surface. In the retracted position, the slider 218 is positioned as far aft as possible, with respect to the flow direction, such that the mobile cowl 216 is moved away from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the retracted position, the mobile cowl 216 and the fan casing 202, and the outer panels 212, are spaced apart from one another and define, between them, the open window 220 between the duct 204 and the exterior of the nacelle 102. That is to say, the air from the bypass flow 208 passes through the window 220 to end up outside the turbofan 100.

The slider 218 is made to translate by any appropriate means, such as slideways between the fixed structure 206 and the slider 218.

The nacelle 102 also comprises a set of actuators (not shown) that move the slider 218 in translation between the advanced position and the retracted position and vice versa. Each actuator is controlled by a control unit, for example of the processor type, which controls the movements in one direction or the other according to the requirements of the aircraft 10.

Each actuator may, for example, take the form of a double-action jack (two working directions), of which the cylinder is fixed to the fixed structure 206 and a rod is fixed to the slider 218.

In order to orient the flow of air leaving the window 220, cascades can be fixed to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of blades 250, each being mounted so as to be able to rotate on the slider 218 about an axis of rotation that, here, is generally parallel to the longitudinal axis X. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 is mounted so as to be able to move at a first end while a second end moves closer to the motor 20 when the blade 250 is deployed so as to best block the duct 204.

The blades 250 are angularly offset from one to the next about the longitudinal axis X.

The number of blades 250, and the shape of each of these, depend on the dimensions of the turbofan 100 and on the width of each blade 250 in order that, in the deployed position, the blades 250 block the majority of the duct 204.

Passage from the stowed position to the deployed position is brought about by rotation of the blade 250 towards the interior of the engine 100.

The stowed position can be adopted when the slider 218 is in the advanced position or the retracted position. The deployed position can be adopted only when the slider 218 is in the retracted position.

The slider 218 also has a maneuvering system 400 which moves each blade 250 from the stowed position to the deployed position.

Thus, operation comprises, starting from the advanced/stowed position, ordering activation of the actuators to move the slider 218 from the advanced position to the retracted position. During or at the end of this movement, the maneuvering system 400 moves the blades 250 from the stowed position to the deployed position.

Conversely, operation thus comprises, starting from the retracted/deployed position, ordering activation of the actuators to move the slider 218 from the retracted position to the advanced position. During or at the start of this movement, the maneuvering system 400 moves the blades 250 from the deployed position to the stowed position.

The use of the blades 250 mounted so as to be able to rotate on the slider 218 makes it possible to lighten the assembly compared to the use of reversal doors of the prior art.

Figure 5:
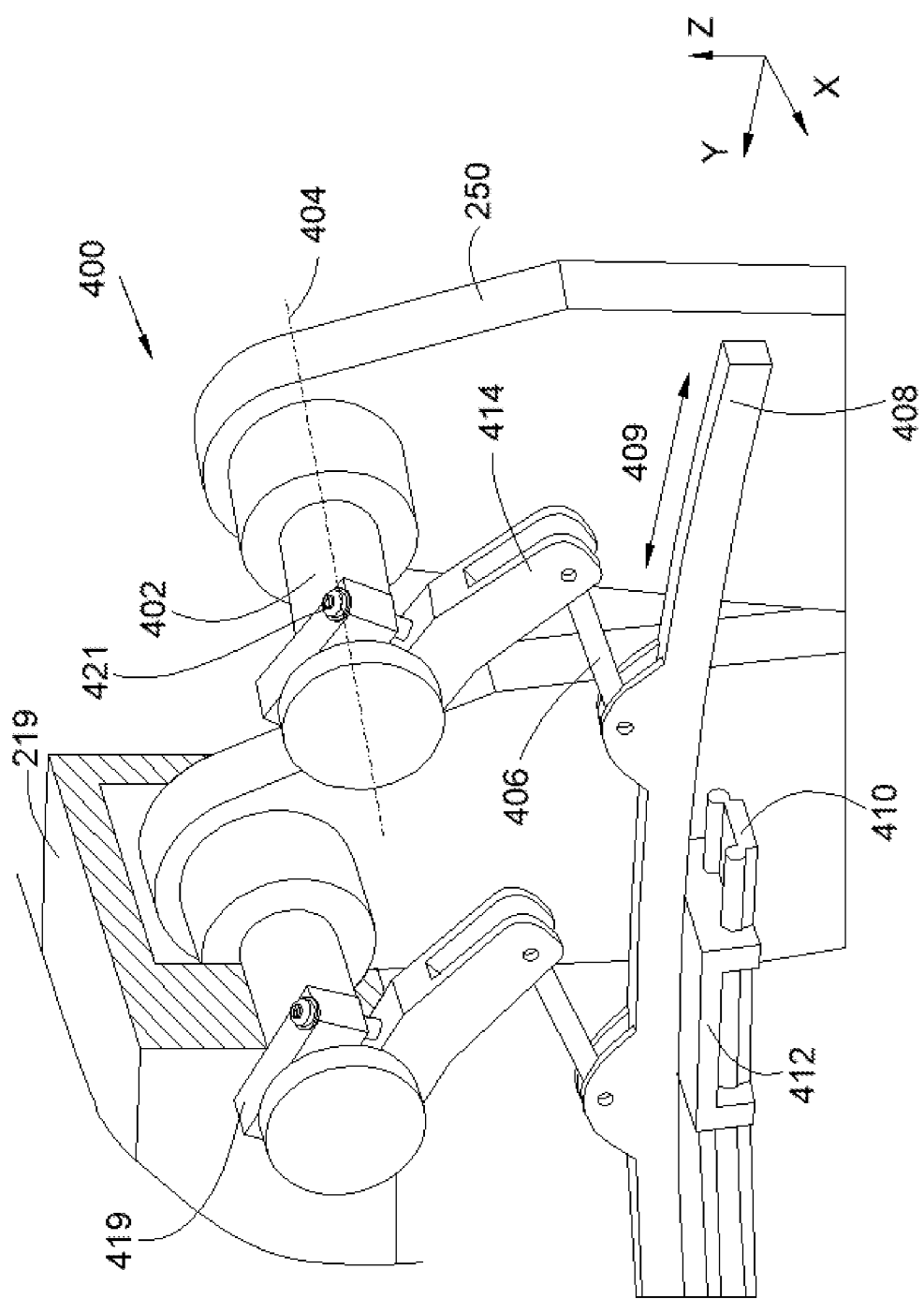
FIG. 5 is a perspective view of a maneuvering system according to the invention.

FIG. 5 shows the maneuvering system 400 on the mobile assembly 214, and more particularly on the slider 218.

For each blade 250, the maneuvering system 400 comprises a shaft 402 which is mounted so as to be mobile in rotation on the slider 218 about an axis of rotation 404, and on which the blade 250 is fixed. In FIG. 5, each blade 250 is truncated in order to facilitate understanding of the mechanism, and only two blades 250 are shown. Moreover, in FIG. 5, the slider 218 is shown in section. The axis of rotation 404 is, in this case, generally parallel to the longitudinal axis X.

For each shaft 402, the maneuvering system 400 also comprises an arm 414 which has a first end fixed to the shaft 402 and a second end.

The maneuvering system 400 also comprises an arc 408 that is coaxial with the longitudinal axis X. The arc 408 is mounted so as to be mobile in rotation (double-headed arrow 409) on the mobile assembly 214, and more particularly on the slider 218, about the longitudinal axis X.

The maneuvering system 400 also comprises an actuation system which rotates the arc 408 in one direction and in the other. In the embodiment of the invention shown in FIG. 5, the actuation system is embodied using a rail 410 which follows the desired curve and at least one carriage 412, where each carriage 412 is secured to the arc 408 and is mounted so as to slide on the rail 410. The rail 410 is mounted fixed on the mobile assembly 214. The actuation system also comprises any appropriate motive means that can allow the carriage or carriages 412 to move along the rail 410, such as a jack mounted in articulated fashion between a carriage 412 and the mobile assembly 214, a motor equipped with a rack gear, etc. The control unit also controls the motive means.

The connection between the carriage 412 and the rail 410 is in this case in the form of a double dovetail.

For each arm 414, that is to say, each blade 250, the maneuvering system 400 also comprises a lever 406 mounted in articulated fashion between the arc 408 and the second end of the arm 414. Each articulation of the lever 406 is in this case in the form of a pivot connection about an axis parallel to the axis of rotation 404.

Thus, a rotary movement of the arc 408 drives each lever 406 and, consequently, the rotation of each arm 414 and hence of the associated shaft 402 and blade 250.

Each blade 250 extends in a plane generally perpendicular to the longitudinal axis X.

Each blade 250 is mounted so as to be able to move on the perimeter of the slider 218. When the blades 250 are in the stowed position, they stack along the longitudinal axis X.

Thus, moving all of the blades 250 is relatively simple to implement, since all that is required is to rotate the arc 408.

In the embodiment of the invention shown in FIG. 5, the first end of each arm 414 takes the form of a pair of pincers 419 that grip the shaft 402 and comprise a tightening screw 421 that tightens the two pincers towards one another. This makes it possible to independently adjust each blade 250.

In the embodiment of the invention shown in FIG. 5, the slider 218 comprises a U-shaped profile 219 that is coaxial with the longitudinal axis X and open towards the longitudinal axis X. The U-shaped 219 profile forms a cage within which the blades 250 are mounted so as to be able to rotate, and where the shafts 402 pass through a wall of the U-shaped profile 219.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and comprising a motor and a nacelle, surrounding the motor, which comprises a fan casing, in which a duct for a bypass flow is delimited between the nacelle and the motor and in which a flow of air flows in a flow direction, said nacelle comprising:
a fixed structure fixed to the fan casing,
a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between them, an open window between the duct and the exterior of the nacelle,
a plurality of blades, each one comprising a first end mounted so as to be mobile in rotation on the slider about an axis of rotation, and where the blades are angularly offset from one to the next about the longitudinal axis, wherein each blade is mobile between a stowed position in which the blade is outside the duct and a deployed position in which the blade is across the duct,
an assembly of actuators causing the slider to move between the advanced position and the retracted position, and vice versa, and
a maneuvering system intended to move each blade from the stowed position to the deployed position and vice versa, where the maneuvering system comprises:
for each blade, a shaft mounted so as to be mobile in rotation on the slider about an axis of rotation, and on which the blade is fixed,
for each shaft, an arm which has a first end fixed to the shaft and a second end,
an arc which is coaxial with the longitudinal axis and is mounted so as to be mobile in rotation, on the slider, about the longitudinal axis,
for each arm, a lever mounted in articulated fashion between the arc and the second end of the arm, and
an actuation system which rotates the arc in one direction and in the other.

2. The turbofan according to claim 1, wherein the first end of each arm is formed as a pair of pincers that grip the shaft and comprise a tightening screw that tightens the two pincers towards one another.

3. An aircraft comprising at least one turbofan according to claim 1.

* * * * *